United States Patent
Robbins

(10) Patent No.: US 9,457,508 B2
(45) Date of Patent: Oct. 4, 2016

(54) THERMOFORMING TRIM REMOVAL SYSTEMS AND METHODS

(71) Applicant: EVO Development, LLC, Bethlehem, PA (US)

(72) Inventor: Robert Dean Robbins, Bethlehem, PA (US)

(73) Assignee: EVO Development, LLC, Bethlehem, PA (US)

( * ) Notice: Subject to any disclaimer, the term of this patent is extended or adjusted under 35 U.S.C. 154(b) by 336 days.

(21) Appl. No.: 14/284,698

(22) Filed: May 22, 2014

(65) Prior Publication Data

US 2014/0345078 A1 Nov. 27, 2014

Related U.S. Application Data

(60) Provisional application No. 61/827,179, filed on May 24, 2013.

(51) Int. Cl.
*A47L 5/38* (2006.01)
*B29C 51/26* (2006.01)
*B08B 5/04* (2006.01)

(52) U.S. Cl.
CPC ............ *B29C 51/266* (2013.01); *A47L 5/38* (2013.01); *B08B 5/04* (2013.01); *Y10T 29/49716* (2015.01)

(58) Field of Classification Search
CPC ....... A47L 5/38; A47L 7/0047; A47L 9/106; A47L 9/00; A47L 9/2842; A47L 11/33; A47L 2201/024; A47L 9/1427; A47L 11/4027; A47L 23/24; A47L 9/102; A47L 9/14; B08B 15/002; B08B 5/04; B23Q 11/0046; B29C 51/266; B65H 2701/33; Y10T 29/49716

See application file for complete search history.

(56) References Cited

U.S. PATENT DOCUMENTS

| | | | |
|---|---|---|---|
| 4,157,175 A | 6/1979 | Patterson | |
| 4,227,280 A | 10/1980 | Comer et al. | |
| 5,509,454 A | 4/1996 | Giacometti | |
| 6,047,693 A | 4/2000 | Yamami et al. | |
| 6,170,118 B1 * | 1/2001 | McIntyre | A47L 5/365 15/323 |
| 6,276,621 B1 | 8/2001 | Henry | |
| 6,289,956 B1 | 9/2001 | Shriver | |
| 6,382,278 B1 | 5/2002 | Liao et al. | |
| 7,100,485 B2 | 9/2006 | Roberts et al. | |
| 7,140,168 B2 | 11/2006 | Pourchet et al. | |
| 7,216,572 B2 | 5/2007 | Keenan | |
| 7,559,268 B2 | 7/2009 | Sasaki et al. | |
| 2003/0066157 A1 * | 4/2003 | Holbrook | B26D 7/1863 15/345 |
| 2006/0156504 A1 * | 7/2006 | Bruneau | A47L 5/22 15/314 |
| 2010/0146794 A1 | 6/2010 | Marcoe | |
| 2012/0247294 A1 | 10/2012 | Martin | |

FOREIGN PATENT DOCUMENTS

DE 19603528 A1 8/1997

* cited by examiner

*Primary Examiner* — Robert Scruggs
(74) *Attorney, Agent, or Firm* — Design IP

(57) ABSTRACT

Embodiments of the present invention provide systems and methods for retrofitting a thermoforming trim removal system to utilize a perforated collection bag to collect waste instead of a rigid collection bin. The perforated collection bag can be made of inexpensive, disposable polymeric materials, including those that can be recycled in the same waste stream as the waste, thereby permitting full bags to be discarded without first emptying their waste contents.

20 Claims, 5 Drawing Sheets

THERMOFORMING TRIM REMOVAL SYSTEMS AND METHODS

BACKGROUND OF THE INVENTION

Thermoforming involves heating plastic materials until pliable, then forming the plastic into a product. For example, thermoforming is used in packaging systems both to create molded containers and to seal the tops of containers with a film of plastic material. When thermoforming a product or sealing a container, excess plastic material (i.e., trim) must be cut away and removed. For example, trim is often excess plastic material at the outer edges of a product that is held by a fixed clamping or piercing process to convey the product through the equipment.

Existing systems for removing thermoforming trim typically include a vacuum system to suction the trim into a waste receptacle having a removable rigid collection bin. Periodically, the rigid collection bin must be removed from the waste receptacle, turned upside down to empty the trim contents, and replaced inside of the waste receptacle. This process can be an arduous task for operators depending on their physical stature and the frequency with which the rigid collection bin must be emptied. In addition, the rigid collection bins are often made of metals that are prone to corrode and require replacement, which can lead to sanitation issues and present a significant operational cost.

There exists an unmet need for improved, cost-effective systems and methods for removing and disposing of thermoforming trim that overcome deficiencies of the prior art.

SUMMARY OF THE INVENTION

Embodiments of the present invention provide systems and methods for retrofitting existing thermoforming trim removal systems to utilize a perforated collection bag (e.g., comprised of polymeric materials) instead of a rigid collection bin. The perforated collection bag has been found to be easier to both remove from the system and empty, as it is considerably lighter than typical rigid collection bins. In addition, the perforated collection bag can be made of inexpensive, disposable polymeric materials, including those that can be recycled in the same waste stream as the trim, thereby permitting full bags to be discarded without first emptying their trim contents and allowing the user to dispose of the bags in ordinary waste refuse streams and/or recycling waste streams (i.e., residential or commercial).

According to one embodiment of the present invention, a system for retrofitting a waste removal system is provided for a waste removal system having a housing with one or more vacuum inlets disposed therein, a lid coupled to the housing, a rigid collection container disposed within the housing and adapted to collect waste, vacuum hosing coupled to the one or more vacuum inlets, and a vacuum source operatively coupled to the housing to suction waste through the vacuum hosing and the one or more vacuum inlets into the rigid collection container. The system comprises a perforated collection bag adapted to be placed inside of the housing instead of the rigid collection container, the perforated collection bag having an opening through which waste can enter the perforated collection bag, the perforated collection bag having a bottom located opposite the opening; an extension having one or more vacuum inlets disposed therein, the extension being adapted to be releasably coupled to the lid, the extension being adapted to be releasably coupled to the housing to secure the perforated collection bag within the housing such that the one or more vacuum inlets disposed in the extension are positioned above the opening of the perforated collection bag, the one or more vacuum inlets disposed in the extension being adapted to be coupled to the vacuum hosing; and one or more objects adapted to block airflow through the one or more vacuum inlets disposed in the housing.

BRIEF DESCRIPTION OF THE DRAWINGS

The present invention will hereinafter be described in conjunction with the appended drawing figures wherein like numerals denote like elements.

DETAILED DESCRIPTION OF THE PREFERRED EMBODIMENTS

Figure 1A:
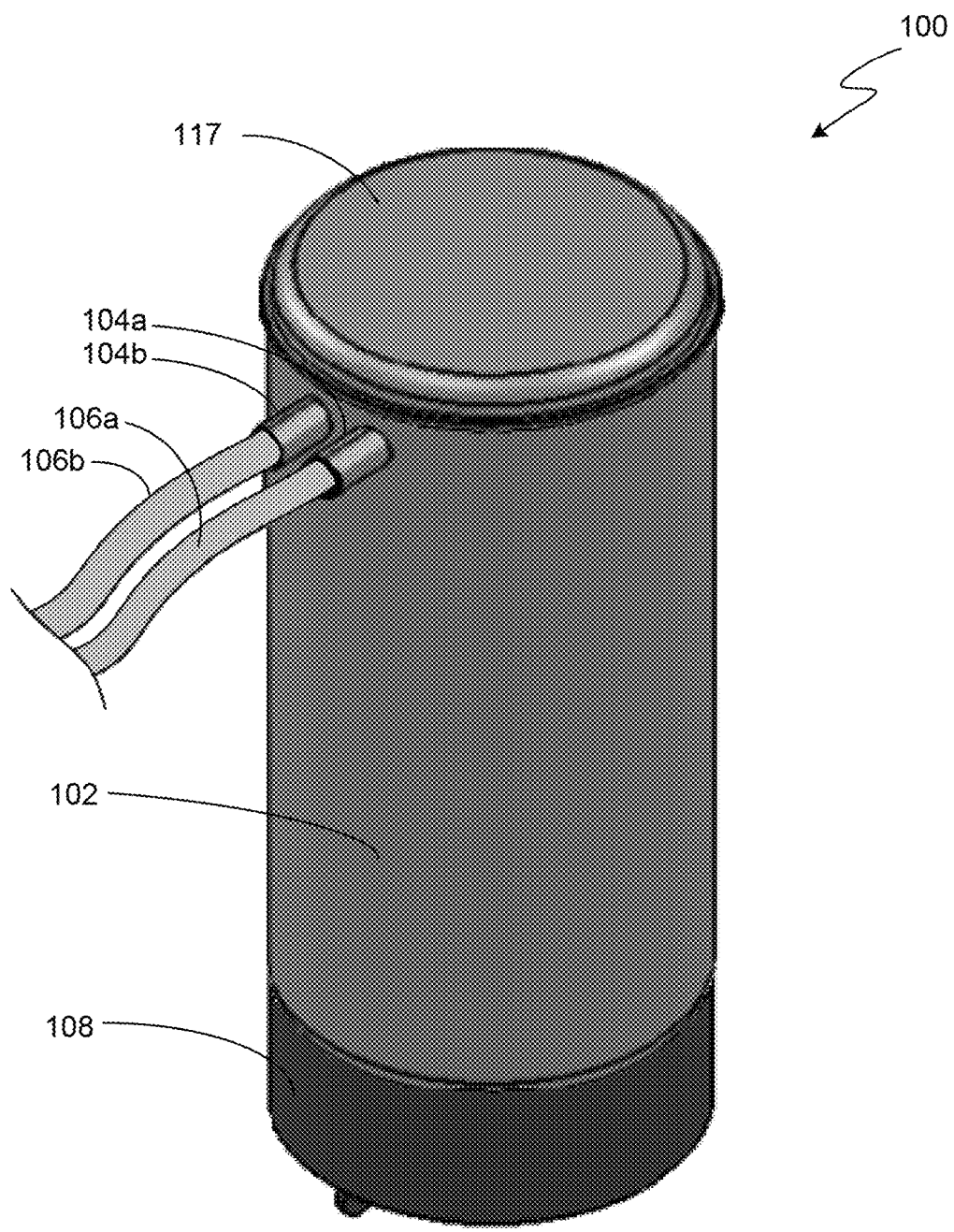
FIG. 1A shows a perspective view of a prior art thermoforming trim removal system.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It being understood that various changes may be made in the function and arrangement of elements without departing from the spirit and scope of the invention, as set forth in the appended claims.

To the extent directional terms are used in the specification and claims to describe portions of the present invention (e.g., upper, lower, etc.), these terms are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features.

Figure 1B:
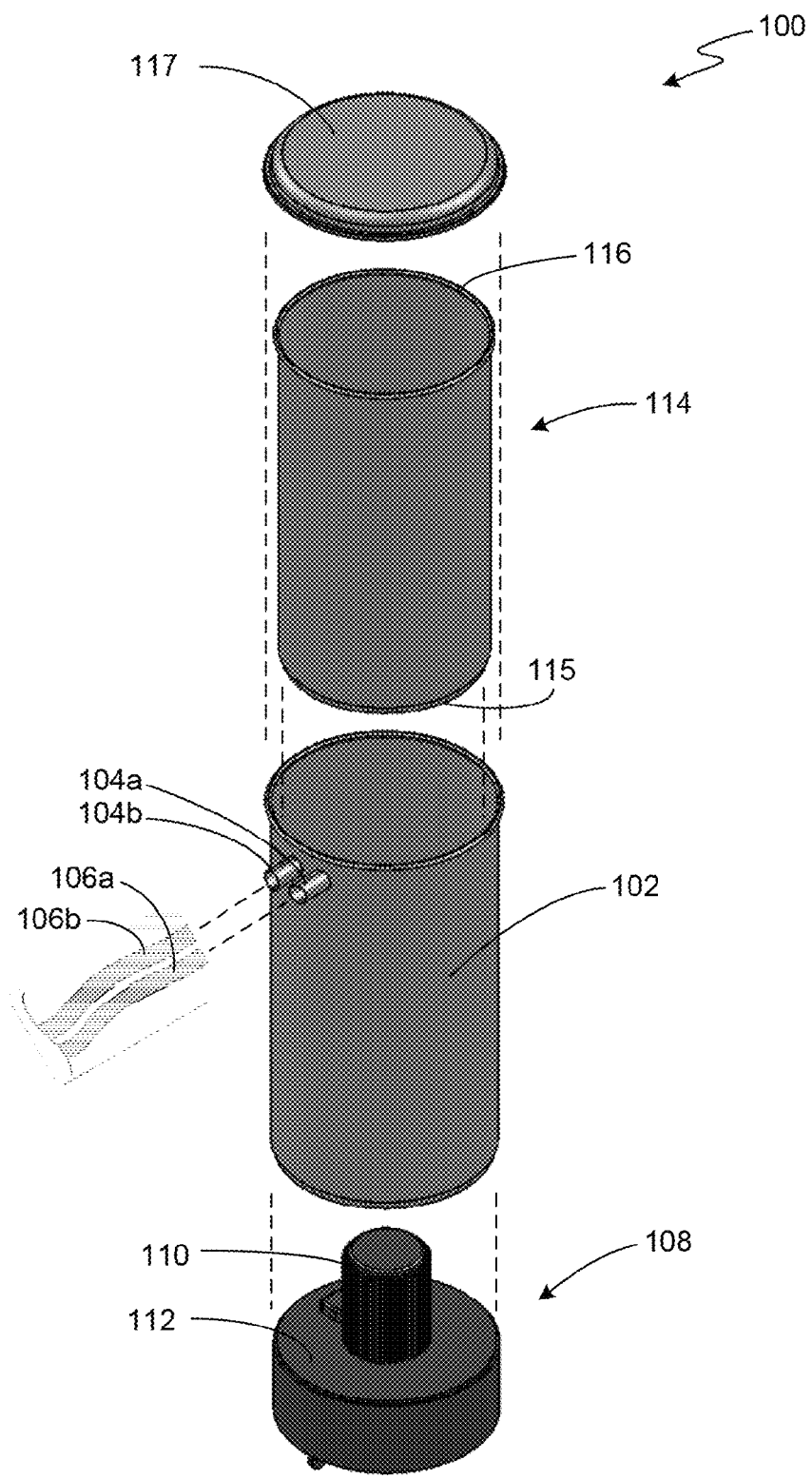
FIG. 1B shows an exploded view of the prior art thermoforming trim removal system of FIG. 1A.

FIGS. 1A and 1B show a perspective view and an exploded view, respectively, of a prior art thermoforming trim removal system 100. The thermoforming trim removal system 100 includes a receptacle housing 102 having two inlets 104a and 104b. Vacuum hosing 106a and 106b is coupled to the respective inlets 104a,104b at one end; the other ends of vacuum hosing 106a,106b are disposed near a thermoforming machine (not shown) which produces the trim to be collected. In other prior art thermoforming trim removal systems, a greater or lesser number of inlets or vacuum hoses may be provided.

The receptacle housing 102 is mounted atop a vacuum motor base 108. The vacuum motor base 108 comprises a vacuum motor housing 110 that houses a vacuum motor (not shown) and a turbine housing 112 that houses one or more turbines (not shown) that are coupled to the vacuum motor.

In operation, the vacuum motor rotates the one or more turbines to generate suction within the receptacle housing 102.

The thermoforming trim removal system 100 includes a rigid collection bin 114 (i.e., a container), which is inserted into the receptacle housing 102. The rigid collection bin 114 may be made of metal. A base 115 of the rigid collection bin 114 has a shape (not shown) such that when the rigid collection bin 114 is inserted into the receptacle housing 102, the base 115 fits over and surrounds the vacuum motor housing 110, and an upper rim 116 of the rigid collection bin 114 is positioned below the inlets 104a,104b. The base 115 of the rigid collection bin 114 also includes one or more openings (not shown) (e.g., grating, slots, holes, etc.) through which air can flow in order to permit suction to be generated within the receptacle housing 102. A lid 117 is mounted atop the receptacle housing 102, enclosing the rigid collection bin 114 within the receptacle housing 102.

When operating the thermoforming trim removal system 100, the vacuum motor base 108 generates suction within the receptacle housing 102 and creates a negative airflow through the hosing 106a,106b and inlets 104a,104b and into the receptacle housing 102. In this manner, a vacuum flow path is created in which trim is drawn into the ends of the hosing 106a,106b disposed near the thermoforming machine (not shown), travels through the hosing 106a,106b and inlets 104a,104b, and is sucked into the rigid collection bin 114. As previously discussed, as the rigid collection bin 114 fills up, it must periodically removed, upended to empty the trim contents, and replaced inside of the receptacle housing 102.

Figure 2A:
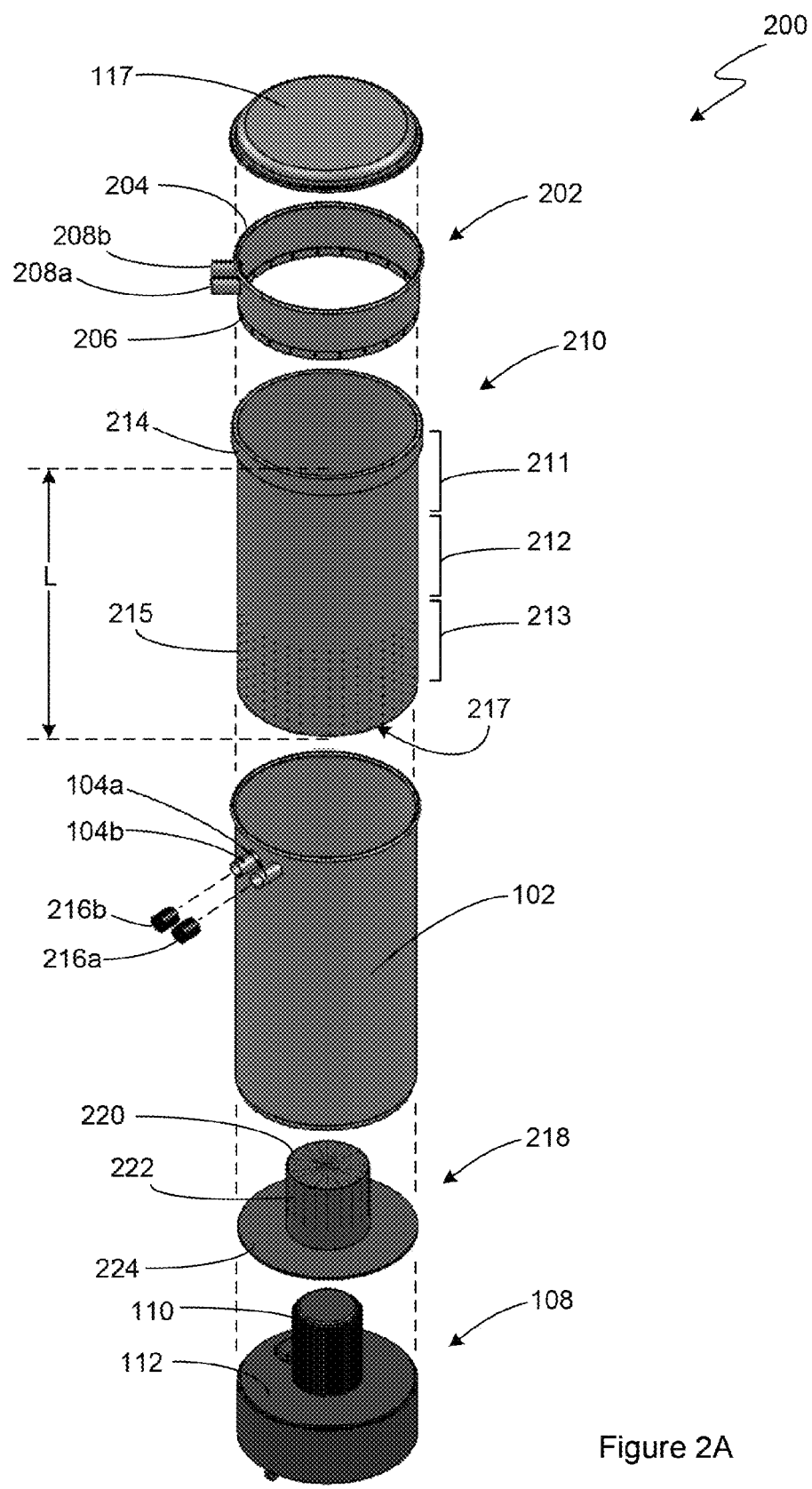
FIG. 2A is an exploded view of a thermoforming trim removal system retrofitted to use a perforated collection bag instead of a rigid collection bin in accordance with an exemplary embodiment of the present invention.
Figure 2B:
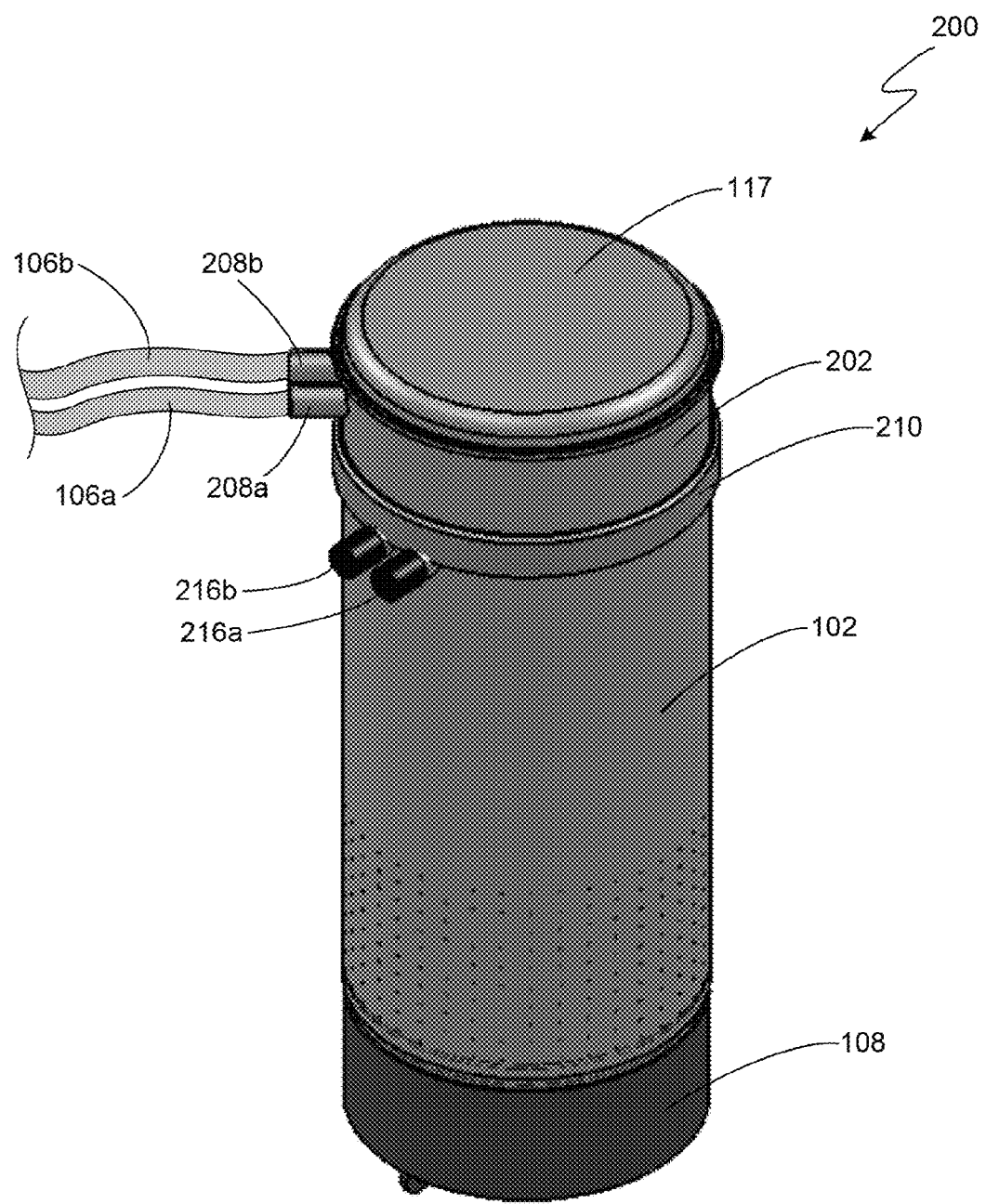
FIG. 2B is a perspective view thereof in an assembled configuration.

FIGS. 2A and 2B show an exploded view and perspective view, respectively, of a thermoforming trim removal system 200 that has been created by retrofitting the thermoforming trim removal system 100 to use a perforated collection bag 210 instead of the rigid collection bin 114 in accordance with an exemplary embodiment of the present invention.

The components of the thermoforming trim removal system 200 that are added to the thermoforming trim removal system 100 in this exemplary embodiment comprise an extension 202, a perforated collection bag 210 that replaces the rigid collection bin 114, a pair of caps 216a and 216b, and a vacuum housing guard 218. Preferably, these and other components are provided as a retrofitting kit for use with existing systems. Alternatively, the thermoforming trim removal system 200 may be sold as a complete system that includes all of the necessary parts as discussed hereinafter.

The extension 202 includes an upper rim 204, a lower rim 206, and two substitute inlets 208a and 208b. In this exemplary embodiment, the upper rim 204 is adapted to releasably mate and seal with the lid 117, and the lower rim 206 is adapted to releasably mate and seal with the receptacle housing 102. In addition, when the perforated collection bag 210 is installed, the lower rim 206 presses a portion of the perforated collection bag 210 against the receptacle housing 102, thereby securing the opening 214 of the perforated collection bag 210 and suspending the perforated collection bag 210 within the receptacle housing 102 (see FIG. 2B), with the substitute inlets 208a,208b positioned above the opening 214 of the perforated collection bag 210. For illustrative purposes, the receptacle housing 102 is shown in FIG. 2B as being partially transparent to show the perforated collection bag 210 located within.

In this exemplary embodiment, the perforated collection bag 210 includes an upper region 211, a middle region 212, a lower region 213 that is nearest to the vacuum motor base 108, an opening 214 located in the upper region 211, a plurality of perforations 215 located in the lower region 213, and a bottom 217 located opposite the opening 214 in the lower region 213. The perforated collection bag 210 is made of one or more polymeric materials that are impermeable to air. For example, the perforated collection bag 210 can be made of one or more polyethylene plastics such as high-density polyethylene (HDPE), low-density polyethylene (LDPE), and linear low-density polyethylene (LLDPE), as well as known biodegradable plastics. Such polymeric materials enable the perforated collection bag 210 to be readily disposable and considerably lighter and less expensive than rigid collection bins, particularly rigid collection bins that are made of metal.

Preferably, the perforated collection bag 210 is made of one or more lightweight polymeric materials that can be disposed of in the same waste stream as their contents, thereby obviating the need for users to separately empty the perforated collection bag 210 to discard the trim contents. In general, however, the perforated collection bag 210 can be implemented with any flexible materials known in the art (i.e., polymeric and/or non-polymeric) having strength characteristics suitable for use in the thermoforming trim removal system 200. Accordingly, in alternate embodiments, the perforated collection bag 210 may be comprised of a lightweight, flexible, sturdy material such that the perforated collection bag 210 may be reused and not discarded after a single use.

The perforated collection bag 210 has a size and shape adapted to occupy a volume within the receptacle housing 102. In this exemplary embodiment, the length L of the perforated collection bag 210 is long enough to enable the bottom 217 of the perforated collection bag 210 to contact the vacuum housing guard 218 (e.g., a length L of 48 inches where the receptacle housing 102 is approximately 42 inches tall). In this embodiment, the upper region 211, middle region 212, and lower region 213 each comprise approximately one-third of the length L and include the respective surface of the perforated collection bag 210 located within those regions (i.e., measured circumferentially around the perimeter of the perforated collection bag 210 along the respective portion of the length L). It should be noted that in FIG. 2A, the opening 214 appears to be wider than the remainder of the perforated collection bag 210. This difference in width is illustrative and represents the opening 214 of the perforated collection bag 210 being folded over a portion of the receptacle housing 102 when the perforated collection bag 210 is inserted into the receptacle housing 102 and secured in place by the extension 202, as previously discussed (see also FIG. 2B). Similarly, the length L, as well as the lengths of the upper region 211, middle region 212, and lower region 213, can vary, and/or the length L of the perforated collection bag 210 can include a greater or lesser number of such regions. Also, while the perforated collection bag 210 is shown as being a cylinder, it should be understood that in actuality the perforated collection bag 210 can be deformed into many shapes. In general, any dimensions depicted in the drawings and discussed herein are illustrative and are not intended to limit the possible dimensions of the components of the thermoforming trim removal system 200 to those which are shown and discussed.

The plurality of perforations 215 allow air to flow through the perforated collection bag 210, but prevent trim contents from escaping the perforated collection bag 210. Accordingly, a suitable size and shape (e.g., circular openings, slits, ovoid openings, etc.) of the plurality of perforations 215 can be selected depending on the size and shape of the trim to be collected in the perforated collection bag 210. In this exemplary embodiment, the plurality of perforations 215 comprise a plurality of circular openings disposed throughout the lower region 213 of the perforated collection bag 210 (see FIG. 2A), including the sidewalls and the bottom 217 of the perforated collection bag 210, where each circular opening has a diameter greater than or equal to 0.125 inches and less than or equal to 0.75 inches. In another embodiment, all perforations of the plurality of perforations 215 are disposed only on the bottom 217 of the perforated collection bag 210.

In general, the quantity and location of the plurality of perforations 215 can be adjusted to optimize performance in a particular application. For example, in this exemplary embodiment, locating the plurality of perforations 215 throughout the lower region 213 of the perforated collection bag 210 helps direct the negative airflow to the bottom of the perforated collection bag 210 to create a more concentrated suction force, as compared to a more diffused suction force that may result where the quantity of the plurality of perforations 215 is increased and/or the perforations are disposed throughout lower region 213, the middle region 212, and the upper region 211 of the perforated collection bag 210. In other embodiments, the plurality of perforations 215 can be disposed in any combination of patterns and locations on the perforated collection bag 210, including perforations located uniformly throughout the entire perforated collection bag 210.

In this exemplary embodiment, the pair of caps 216a,216b are used to cap the inlets 104a,104b of the receptacle housing 102, and the vacuum hosing 106a,106b is instead coupled to the substitute inlets 208a,208b of the extension 202 (see FIG. 2B), thereby redirecting the vacuum flow path above the opening 214 of the perforated collection bag 210. In other embodiments, one or more plugs or other objects can be used to cap, plug, or otherwise block airflow through the inlets 104a,104b.

The vacuum housing guard 218 is positioned atop the vacuum motor base 108 and serves to prevent the perforated collection bag 210 from contacting the vacuum motor housing 110 (i.e., getting sucked into the vacuum motor housing 110) when the perforated collection bag 210 is secured within the receptacle housing 102 during operation. A protruding region 220 of the vacuum housing guard 218 includes perforations and is adapted in shape and size to cover the vacuum motor housing 110, while a flat region 224 of the vacuum housing guard 218 is adapted to contact the turbine housing 112 in a flush manner. In other embodiments, the vacuum housing guard 218 can have different shapes and sizes, as will be apparent to those of ordinary skill in the art.

When operating the thermoforming trim removal system 200, the vacuum motor base 108 generates suction within the receptacle housing 102 and creates a negative airflow through the hosing 106a,106b and the substitute inlets 208a,208b (i.e., instead of the inlets 104a,104b) into the receptacle housing 102. In this manner, a vacuum flow path is created in which trim is drawn into the opposing ends of the hosing 106a,106b (not shown), travels through the hosing 106a,106b and substitute inlets 208a,208b, and is sucked into the perforated collection bag 210. The perforated collection bag 210 can then be periodically removed with significantly less effort than would be necessary to remove a typical rigid collection bin. Further, where the materials used to make the perforated collection bag 210 can be disposed in the same waste stream as the trim contents, the entire perforated collection bag 210 can be conveniently disposed of without separately emptying the trim contents. In addition, components of the thermoforming trim removal system 200 that are added to an existing thermoforming trim removal system can be subsequently removed to return the existing thermoforming trim removal system to its original configuration.

Figure 3:
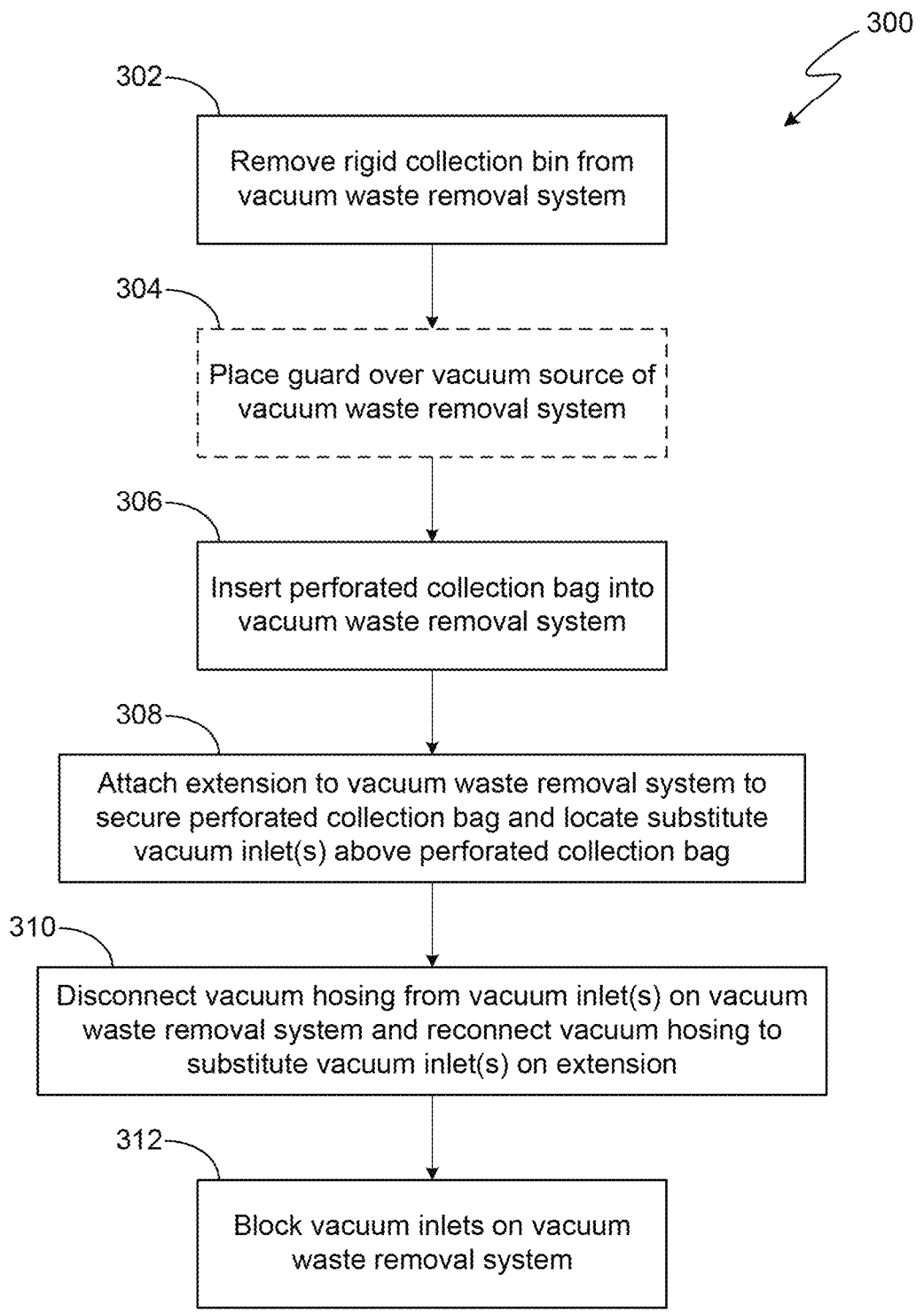
FIG. 3 is a flowchart illustrating steps for retrofitting a vacuum waste removal system to use a perforated collection bag instead of a rigid collection bin in accordance with an exemplary embodiment of the present invention.

FIG. 3 is a flowchart illustrating a method for retrofitting a vacuum waste removal system to use a perforated collection bag instead of a rigid collection bin in accordance with an exemplary embodiment of the present invention. The vacuum waste removal system may be one which removes thermoforming trim, paper trim, or any other suitable waste such as cuttings and shavings. The following steps need not be performed in the particular order in which they are discussed and depicted in FIG. 3. Similarly, retrofitting a vacuum waste removal system in accordance with embodiments of the present invention may involve incidental steps that are not discussed herein (e.g., loosening and tightening fasteners, connecting power supplies, etc.).

In step 302, a rigid collection bin is removed from the housing of an existing vacuum waste removal system (e.g., receptacle housing 102 of the thermoforming trim removal system 100).

In step 304, a guard (e.g., vacuum housing guard 218) is optionally placed over any exposed portion of the vacuum source (e.g., vacuum motor base 108) that might be contacted by a perforated collection bag when the bag is inserted into the housing of the vacuum waste removal system in place of the rigid collection bin and the vacuum source is operated.

In step 306, a perforated collection bag (e.g., perforated collection bag 210) is inserted into the housing of the vacuum waste removal system in place of the removed rigid collection bin.

In step 308, an extension having one or more substitute inlets (e.g., extension 202) is attached to the housing of the vacuum waste removal system to secure the perforated collection bag inside of the housing of the vacuum waste removal system and to locate the one or more substitute inlets above the perforated collection bag.

In step 310, vacuum hosing (e.g., hosing 106) is disconnected from one or more vacuum inlets on the vacuum waste removal system (e.g., inlets 104a,104b) and reconnected to the one or more substitute vacuum inlets located on the extension (e.g., substitute inlets 208a,208b).

In step 312, the one or more vacuum inlets on the vacuum waste removal system are blocked (e.g., with caps 216a, 216b) or otherwise sealed off. After performing step 312, the vacuum waste removal system can be operated as previously discussed.

Accordingly, embodiments of the present invention provide efficient, cost-effective, and reversible systems and methods for retrofitting a thermoforming trim removal system (and similar vacuum waste removal systems) to utilize perforated collection bags instead of rigid collection bins. Usage of perforated collection bags instead of traditional rigid collection bins can result in considerable cost savings and improved operational efficiency on account of being considerably lighter and easier to empty and/or discard, and on account of being less expensive to buy and replace.

While the principles of the invention have been described above in connection with preferred embodiments, it is to be clearly understood that this description is made only by way of example and not as a limitation of the scope of the invention.

The invention claimed is:

1. A system for retrofitting a waste removal system, the waste removal system having a housing with one or more vacuum inlets disposed therein, a lid coupled to the housing, a rigid collection container disposed within the housing and adapted to collect waste, vacuum hosing coupled to the one or more vacuum inlets, and a vacuum source operatively coupled to the housing to suction waste through the vacuum hosing and the one or more vacuum inlets into the rigid collection container, the system comprising:

a perforated collection bag adapted to be placed inside of the housing instead of the rigid collection container, the perforated collection bag having an opening through which waste can enter the perforated collection bag, the perforated collection bag having a bottom located opposite the opening;

an extension having one or more vacuum inlets disposed therein, the extension being adapted to be releasably coupled to the lid, the extension being adapted to be releasably coupled to the housing to secure the perforated collection bag within the housing such that the one or more vacuum inlets disposed in the extension are positioned above the opening of the perforated collection bag, the one or more vacuum inlets disposed in the extension being adapted to be coupled to the vacuum hosing; and one or more objects adapted to block airflow through the one or more vacuum inlets disposed in the housing.

2. The system of claim 1, further comprising a guard adapted to cover at least a portion of the vacuum source within the housing.

3. The system of claim 1, wherein the waste removal system is a thermoforming trim removal system.

4. The system of claim 1, wherein the perforated collection bag is comprised of one or more polymeric materials that are impermeable to air.

5. The system of claim 4, wherein the one or more polymeric materials can be disposed of in a same waste stream as waste contained in the perforated collection bag.

6. The system of claim 4, wherein the perforated collection bag includes a plurality of perforations, each perforation of the plurality of perforations having a size such that waste that enters the perforated collection bag cannot pass through the plurality of perforations.

7. The system of claim 6, wherein each perforation of the plurality of perforations has a circular shape with a diameter greater than or equal to 0.125 inches and less than or equal to 0.75 inches.

8. The system of claim 6, wherein each perforation of the plurality of perforations is located in the bottom of the perforated collection bag.

9. A waste removal system, the waste removal system comprising:

a housing with one or more vacuum inlets disposed therein;

one or more objects coupled to the vacuum inlets disposed in the housing, the one or more objects adapted to block airflow through the one or more vacuum inlets disposed in the housing;

an extension coupled to the housing, the extension having one or more vacuum inlets disposed therein, the one or more vacuum inlets disposed in the extension being adapted to attach to vacuum hosing;

a lid coupled to the extension;

a vacuum source coupled to the housing; and a perforated collection bag disposed within the housing, the perforation collection bag having an opening through which waste can enter and a bottom opposite the opening, the opening being disposed below the one or more vacuum inlets disposed in the extension.

10. The system of claim 9, further comprising a guard covering at least a portion of the vacuum source.

11. The system of claim 9, wherein an upper rim of the extension is coupled to the lid and a lower rim of the extension is coupled to the housing.

12. The system of claim 9, wherein the perforated collection bag is comprised of one or more polymeric materials that are impermeable to air.

13. The system of claim 12, wherein the one or more polymeric materials can be disposed of in a same waste stream as waste contained in the perforated collection bag.

14. The system of claim 9, wherein the perforated collection bag includes a plurality of perforations, each perforation of the plurality of perforations having a size such that waste that enters the perforated collection bag cannot pass through the plurality of perforations.

15. The system of claim 14, wherein each perforation of the plurality of perforations has a circular shape with a diameter greater than or equal to 0.125 inches and less than or equal to 0.75 inches.

16. The system of claim 14, wherein each perforation of the plurality of perforations is located in the bottom of the perforated collection bag.

17. A method for retrofitting a waste removal system, the waste removal system having a housing with one or more vacuum inlets disposed therein, a lid coupled to the housing, a rigid collection container disposed within the housing, vacuum hosing coupled to the one or more vacuum inlets, and a vacuum source operatively coupled to the housing to suction waste through the vacuum hosing and the one or more vacuum inlets into the rigid collection container, the method comprising:

removing the rigid collection container from the housing;

inserting a perforated collection bag into the housing;

attaching an extension to the housing, the extension having one or more vacuum inlets disposed therein;

attaching the lid to the extension;

connecting the vacuum hosing to the one or more vacuum inlets disposed in the extension; and blocking airflow through the one or more vacuum inlets disposed in the housing.

18. The method of claim 17, further comprising covering at least a portion of the vacuum source located within the housing with a guard.

19. The method of claim 17, further comprising discarding the perforated collection bag in a waste stream in which waste that is contained the perforated collection bag can also be disposed.

20. The method of claim 17, wherein the step of inserting a perforated collection bag into the housing further comprises locating the opening of the perforated collection bag below the one or more vacuum inlets disposed in the extension.

* * * * *